(12) United States Patent
Mayer Pujadas et al.

(10) Patent No.: US 10,661,601 B2
(45) Date of Patent: May 26, 2020

(54) VEHICLE WHEEL TRIM

(71) Applicant: ZANINI AUTO GRUP, S.A., Parets del Valles, Barcelona (ES)

(72) Inventors: August Mayer Pujadas, Barcelona (ES); Guillem Domínguez Santaló, Barcelona (ES); Marçal Mascaró Hereza, Barcelona (ES)

(73) Assignee: ZANINI AUTO GRUP, S.A., Parets del Valles, Barcelona (ES)

( * ) Notice: Subject to any disclaimer, the term of this patent is extended or adjusted under 35 U.S.C. 154(b) by 193 days.

(21) Appl. No.: 15/537,042

(22) PCT Filed: Dec. 16, 2015

(86) PCT No.: PCT/ES2015/070916
§ 371 (c)(1),
(2) Date: Jun. 16, 2017

(87) PCT Pub. No.: WO2016/097451
PCT Pub. Date: Jun. 23, 2016

(65) Prior Publication Data
US 2017/0341462 A1    Nov. 30, 2017

(30) Foreign Application Priority Data
Dec. 16, 2014 (EP) ..................... 14382522

(51) Int. Cl.
*B60B 7/06* (2006.01)
*B60B 7/08* (2006.01)
(Continued)

(52) U.S. Cl.
CPC ............ *B60B 7/068* (2013.01); *B60B 7/06* (2013.01); *B60B 7/065* (2013.01); *B60B 7/08* (2013.01); *B60B 7/10* (2013.01); *B60B 7/14* (2013.01)

(58) Field of Classification Search
CPC .......... B60B 7/00; B60B 7/0013; B60B 7/06; B60B 7/061; B60B 7/068
See application file for complete search history.

(56) References Cited

U.S. PATENT DOCUMENTS 2,837,376 A * 6/1958 Bruno .................... A63C 17/22
301/37.31
4,874,206 A    10/1989 Sampson
(Continued)

FOREIGN PATENT DOCUMENTS

CN  203063546  7/2013
EP  0 604 253 A1  6/1994
(Continued)

OTHER PUBLICATIONS

Machine translation of CN203063546 (2013), 4 pages (Year: 2013).*
(Continued)

*Primary Examiner* — Jason R Bellinger
(74) *Attorney, Agent, or Firm* — Gary J. Gershik; Cooper & Dunham LLP

(57) ABSTRACT

A vehicle wheel trim is provided which includes a disc (1) and provisions for fastening the disc (1) to a wheel of a vehicle. The provisions for fastening the disc (1) to the wheel include a plurality of magnets (2) that can be fastened to screws (7) that fasten the wheel to the vehicle. Each of the magnets (2) is placed on the inside of a housing (3) and is associated with a fastening element (4, 4b, 4c, 4d) for fastening the magnet (2) to said housing (3).

4 Claims, 4 Drawing Sheets

(51) Int. Cl.
  *B60B 7/10*       (2006.01)
  *B60B 7/14*       (2006.01)

(56) References Cited

U.S. PATENT DOCUMENTS

| | | |
|---|---|---|
| 7,374,248 B1 | 5/2008 | Clayton |
| 2003/0137187 A1 | 7/2003 | Williams |
| 2006/0226697 A1 | 10/2006 | Sampson |
| 2007/0052281 A1 | 3/2007 | Stuckel |
| 2010/0194181 A1 | 8/2010 | Noriega |
| 2014/0152078 A1 | 6/2014 | Noriega |
| 2015/0035346 A1* | 2/2015 | Wang ................. B60B 7/066 301/37.102 |

FOREIGN PATENT DOCUMENTS

| | | |
|---|---|---|
| GB | 1150124 | 4/1969 |
| GB | 2319754 A | 6/1998 |
| JP | H06 032101 | 2/1994 |
| JP | 2014 227084 | 12/2014 |

OTHER PUBLICATIONS

International Search Report issued by the International Searching Authority (ISA/O.E.P.M.) dated Feb. 10, 2016 in connection with International Application No. PCT/ES2015/070916.
Extended European Search Report issued by the European Patent Office dated Jul. 9, 2018 in connection with International Application No. EP 15 86 9396.

\* cited by examiner

VEHICLE WHEEL TRIM

RELATED APPLICATIONS

This application is a § 371 national stage of PCT International Application No. PCT/ES2015/070916, filed Dec. 16, 2015, claiming priority of European Patent Application EP14382522.2, filed Dec. 16, 2014 the contents of each of which are hereby incorporated by reference into this application.

The present invention relates to a vehicle wheel trim, which allows for fastening the trim to the rim of a vehicle wheel by means of magnets.

BACKGROUND OF THE INVENTION

Wheel trims are elements that can be coupled to the outside of wheels of a vehicle, and are able to provide style, and in some cases also improvements to the aerodynamics of the vehicle.

The fastening of the trims of the wheels of the vehicles has been traditionally done by means of plastic elements that are coupled to the surface of the rim using pressure.

For example, a solution used to couple the trim to the rims of the wheels consists of endowing the wheel trim with a metallic ring flexible in the inner portion thereof, which fits in fastening modules of the wheel trim by means of pressure.

The main disadvantage of this system of coupling with rings is that the placement of the ring in said fastening modules must be done manually, individually coupling the ring in each fastening module, which is inconvenient and costly.

There are also several retention systems based on fastening the wheel trim to a wheel through the screws that fasten the wheel to the vehicle. This type of solution requires screws with a specific geometry, impeding the standardization sought by car manufacturers. The present invention enables the retention of the trim in the wheel of the vehicle through commonly used (standard) screws.

Therefore, the objective of the present invention is to allow a quick, simple and intuitive fastening of the wheel trim to the wheel of the vehicle. It should also offer important advantages at the level of standardization of rims and screws.

DESCRIPTION OF THE INVENTION

The vehicle wheel trim of the invention resolves the aforementioned drawbacks and has other advantages which are described below.

The vehicle wheel trim according to the present invention comprises a disc that in the position of use thereof covers a vehicle wheel, and means for fastening the disc to the wheel, and the means for fastening the disc to the rim comprise a plurality of magnets that can be fastened to screws that fasten the wheel to the vehicle.

Advantageously, each of the magnets is placed inside of a housing, and each one of the magnets is associated with a fastening element for the fastening thereof to said housing.

Preferably, said housings are placed equidistantly around the center of said disc.

According to a first embodiment, said fastening element can be a clip provided with legs that are in contact with the inner portion of the housing.

According to another embodiment, said fastening element can be a hook that is coupled with a rib of said disc, the fastening element of which can be made of only one piece with said housing.

According to two other possible embodiments, said fastening element can be a screw that is housed in a hole of the magnet and that is screwed into the bottom of said housing, or even a plurality of elastic tabs that are coupled using pressure with protrusions complementary to the housing. In this case, the elastic tabs could be made of only one piece with said housing.

If desired, said fastening element could be a lower threading of said housing for the magnet, or a protrusion that is coupled using pressure in a slot of said housing for the magnet, according to two alternative embodiments.

With the vehicle wheel trim of the invention, it is possible to achieve a quick, simple and intuitive fastening of the trim to the vehicle wheel, also offering important advantages at the level of standardization of rims and screws.

BRIEF DESCRIPTION OF THE DRAWINGS

For the purpose of helping to make the foregoing description more readily understandable, it is accompanied by a set of drawings which, schematically and by way of illustration and not limitation, represent an embodiment.

DESCRIPTION OF A PREFERRED EMBODIMENT

Below, four alternative embodiments of the vehicle wheel trim according to the present invention will be described. For simplicity, in the description of these embodiments, the same reference numbers are used to indicate elements that carry out the same function.

Figure 1:
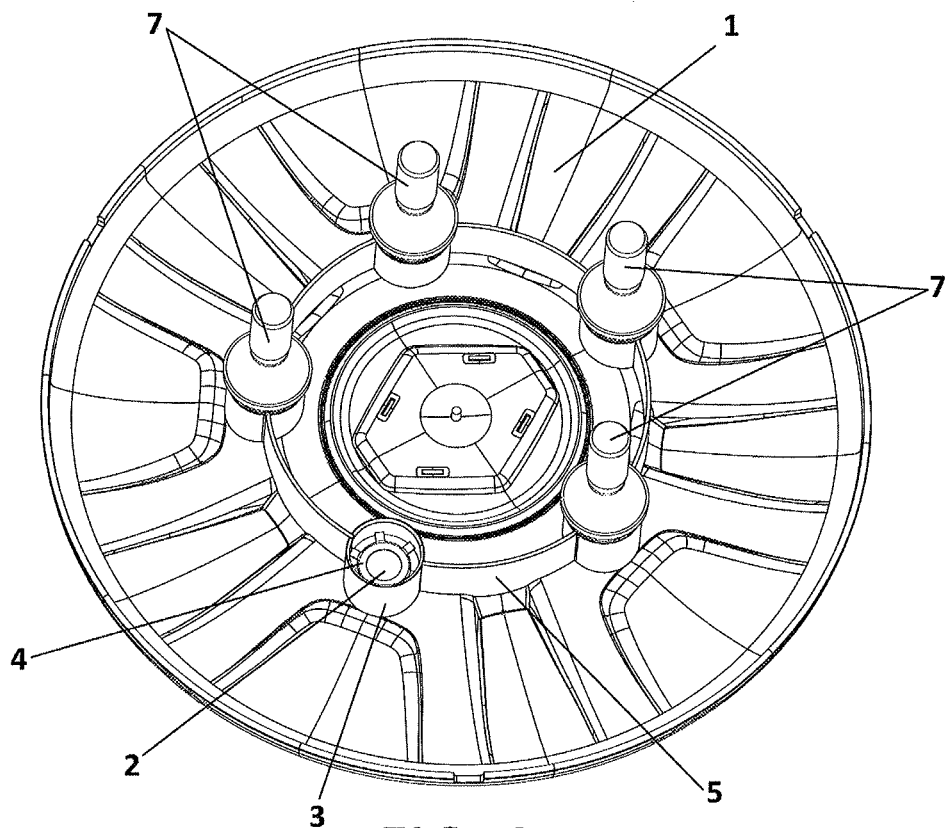
FIG. 1 is a perspective view of the wheel trim of the present invention, according to a first embodiment.
Figure 2:
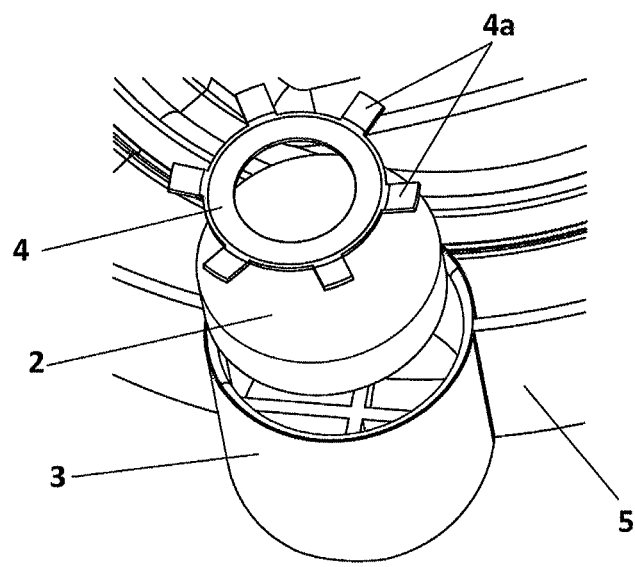
FIG. 2 is an exploded perspective view of a housing, a magnet and a fastening element according to said first embodiment.

FIGS. 1 and 2 show a first embodiment of the vehicle wheel trim according to the present invention.

According to this embodiment, the wheel trim is made up of a disc (1) that is fastened to a wheel (not shown in the figures) by means of a plurality of magnets (2) housed in corresponding housings (3) made in said disc (1).

It should be noted that this figure shows a plurality of screws (7) for the fastening of the wheel to the vehicle, and the magnets (2) of the wheel trim will be fastened to said screws (7).

According to the present invention, said housings (3) are tubular, plastic protrusions placed equidistantly around the center of the disc (1), and they are preferably joined by ribs (5), defining a circular shape.

As seen in FIG. 2, each magnet (2) has an associated fastening element (4) to fasten the magnet (2) on the inside of the housing (3) thereof, preventing the accidental withdrawal thereof.

According to this embodiment, the fastening element (4) is a clip provided with legs (4a), which are in contact with the inner portion of said housing (3).

Figure 3:
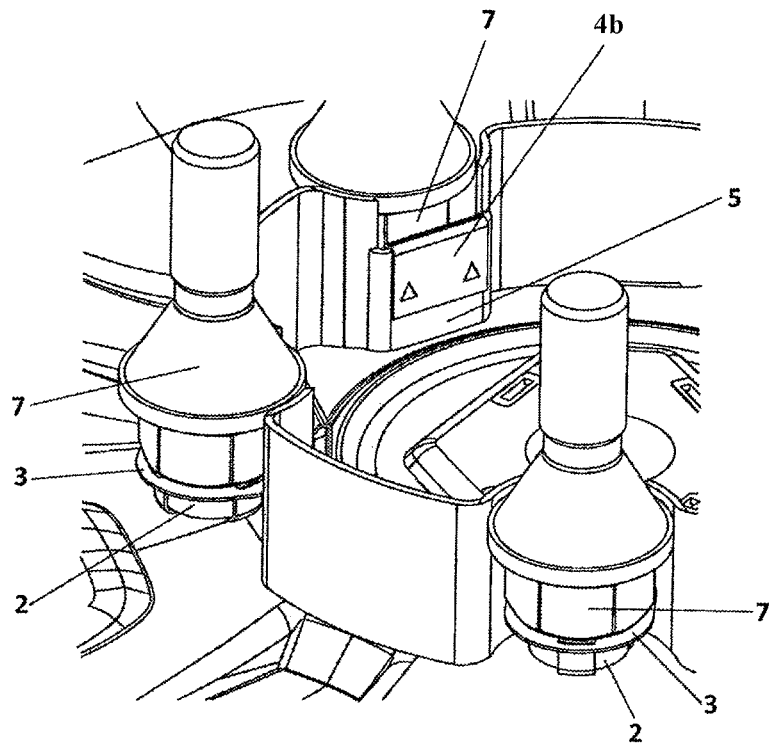
FIG. 3 is a perspective view of a detail of the wheel trim of the present invention, according to a second embodiment.
Figure 4:
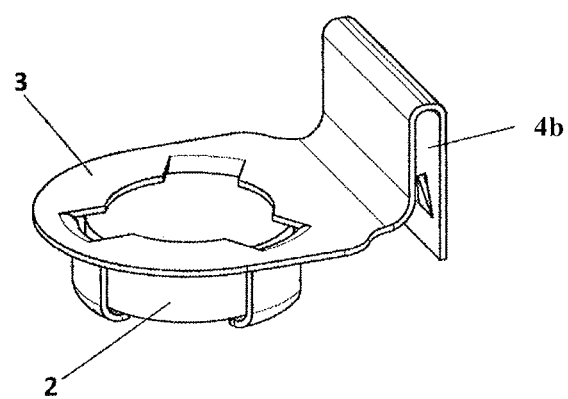
FIG. 4 is a perspective view of a housing, a magnet and a fastening element according to said second embodiment.

FIGS. 3 and 4 show a second embodiment of the vehicle wheel trim according to the present invention. It should be noted that for clarity FIG. 3 shows only one portion of the wheel trim.

In this case, the fastening of the magnets (2) is carried out by means of a hook-type fastening element (4b), which is fastened to said rib (5) envisaged in the disc (1) which makes up the wheel trim of the present invention.

Said hook-type fastening element (4b), and the housing 3 for the magnet 2, are preferably made up of only one metallic piece, as can be better seen in FIG. 4.

Figure 5:
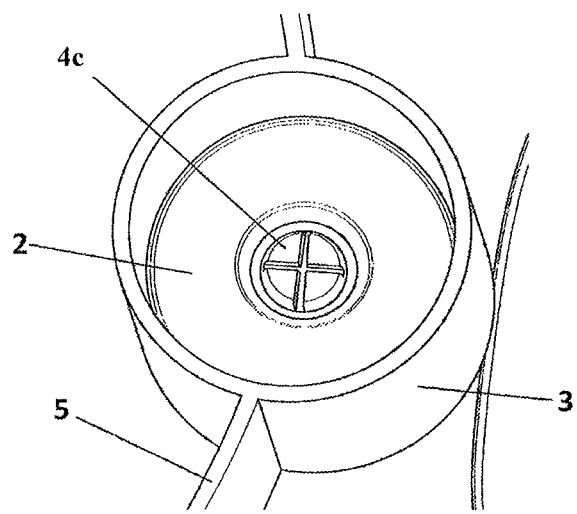
FIG. 5 is a perspective view of a housing, a magnet and a fastening element according to a third embodiment of the wheel trim of the present invention.
Figure 6:
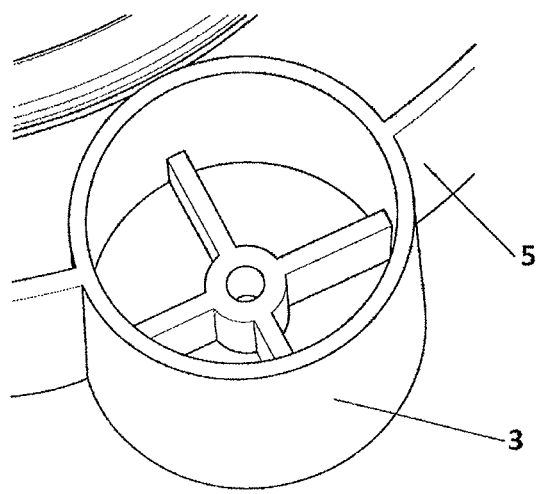
FIG. 6 is a perspective view of a housing according to said third embodiment.

FIGS. 5 and 6 show a third embodiment of the vehicle wheel trim according to the present invention. As in the previous case, it should be noted that for clarity these figures show only one portion of the wheel trim.

According to this third embodiment, the fastening element (4c) is a screw that is housed in a through hole of the magnet (2), threading itself into the lower portion or base of the housing (3), which can be provided with a complementary hole, as seen in FIG. 6.

Figure 7:
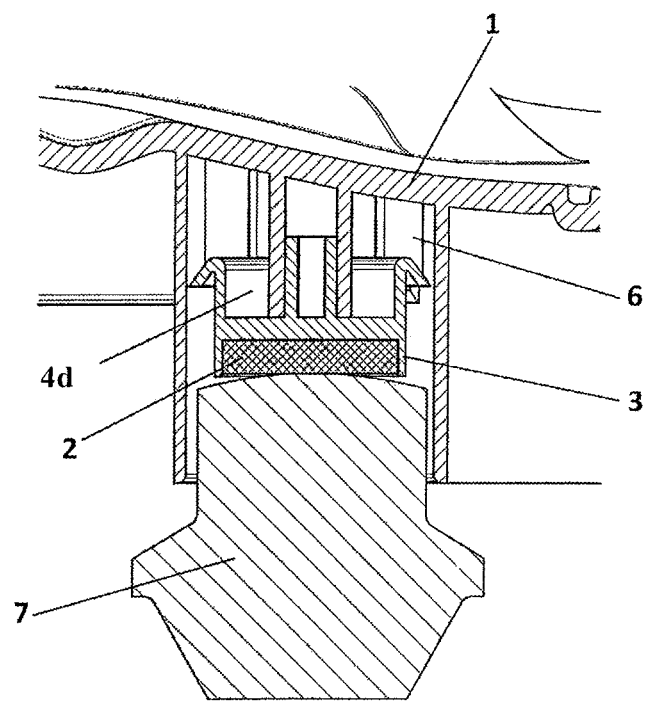
FIG. 7 is a cross section of a housing, a magnet and a fastening element according to a fourth embodiment of the wheel trim of the present invention.
Figure 8:
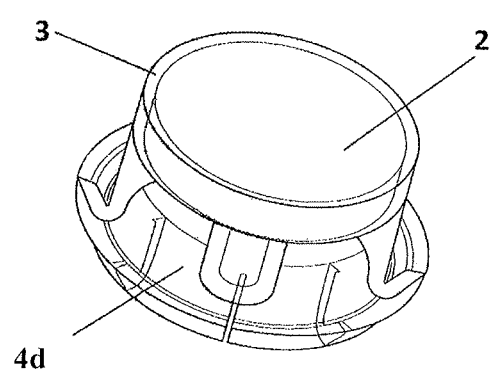
FIG. 8 is a perspective view of a cross section of a housing, a magnet and a fastening element according to said fourth embodiment.

FIGS. 7 and 8 represent a fourth embodiment of the vehicle wheel trim according to the present invention. As in the previous cases, it should be noted that for clarity these figures show only one portion of the wheel trim.

According to this fourth embodiment, the fastening element (4d) is made up of a plurality of elastic tabs that are coupled using pressure with protrusions (6) complementary to the housing (3) for the magnet (2).

According to this embodiment, these elastic tabs that make up the fastening element (4d), and the housing (3) for the magnet (2), are made up of only one piece.

It should be noted that these elastic tabs of this embodiment can be substituted by an inner threading or a coupling using pressure by means of a protrusion that is housed in a complementary slot.

Despite the fact that reference has been made to a specific embodiment of the invention, it is evident for the person skilled in the art that numerous variations and changes may be made to the hubcap for vehicle wheels described, and that all the aforementioned details may be substituted by other technically equivalent ones, without detracting from the scope of protection defined by the attached claims.

The invention claimed is:

1. A vehicle wheel trim, comprising:
a disc (1); and
means for fastening the disc (1) to a wheel, wherein the means for fastening the disc (1) to the wheel comprise a plurality of magnets (2) configured to be fastened to screws (7) that in turn fasten the wheel to the vehicle,
wherein each of the magnets (2) is placed on the inside of a housing (3) and is associated with a fastening element (4, 4b, 4c, 4d) for fastening the magnet (2) to said housing (3),
wherein the fastening element (4, 4b, 4c, 4d) is one of:
a clip provided with legs (4a) that are in contact with an inner portion of the housing (3),
a hook (4b) that is coupled to a rib (5) of said disc (1),
a screw (4c) that is housed in a hole of the magnet (2) and that is screwed into the bottom of said housing (3), or
a plurality of elastic tabs (4d) that are configured to be coupled to protrusions (6) complementary to the housing (3).

2. The vehicle wheel trim according to claim 1, wherein said housings (3) are placed equidistantly around the center of said disc (1).

3. The vehicle wheel trim according to claim 1, wherein said hook-type fastening element (4b), and said housing (3) for the magnet, comprise an integral piece.

4. The vehicle wheel trim according to claim 1, wherein said elastic tabs fastening element (4d), and said housing (3) for the magnet (2), comprise an integral piece.

* * * * *